United States Patent [19]

Perry

[11] Patent Number: 4,665,709

[45] Date of Patent: May 19, 1987

[54] STEAM POWERED HEATING/COOLING SYSTEMS

[76] Inventor: James E. Perry, 9814 Hardesty, Kansas City, Mo. 64137

[21] Appl. No.: 700,409

[22] Filed: Feb. 11, 1985

[51] Int. Cl.⁴ ............................................. F25B 15/00
[52] U.S. Cl. ....................................... 62/141; 62/148; 62/476; 165/61
[58] Field of Search ......................... 62/141, 148, 476; 165/61; 237/7

[56] References Cited

U.S. PATENT DOCUMENTS

| | | | |
|---|---|---|---|
| 3,195,318 | 7/1965 | Miner | 62/148 |
| 3,949,566 | 4/1976 | Hopkins | 62/475 |
| 4,322,951 | 4/1982 | Alfano | 62/148 X |
| 4,373,347 | 2/1983 | Howell et al. | 62/148 X |

Primary Examiner—Albert W. Davis, Jr.
Assistant Examiner—Randolph A. Smith

[57] ABSTRACT

Improvements in heating and cooling systems which are steam powered, the (winter) heating system utilizing a steam/liquid heat exchanger and the (summer) cooling system utilizing a steam powered absorption machine; methods of and apparatus for substantially improving a steam powered heating system conventionally having a boiler, a heat source for the boiler, a steam/liquid heat exchanger, a steam trap for the heat exchanger, a condensate tank with a vent line to atmosphere and work to be heated; methods of and apparatus for substantially improving a steam powered cooling system conventionally having a boiler, a heat source for said boiler an absorption machine having a generator section and an absorption section, a steam trap for the generator section of the absorption machine, a condensate tank with a vent line to atmosphere and work to be heated; methods of and apparatus for markedly increasing energy efficiency and efficient functional capacity in the heating and/or cooling systems in question.

7 Claims, 2 Drawing Figures

STEAM POWERED HEATING/COOLING SYSTEMS

BACKGROUND OF THE INVENTION

Figure 1:
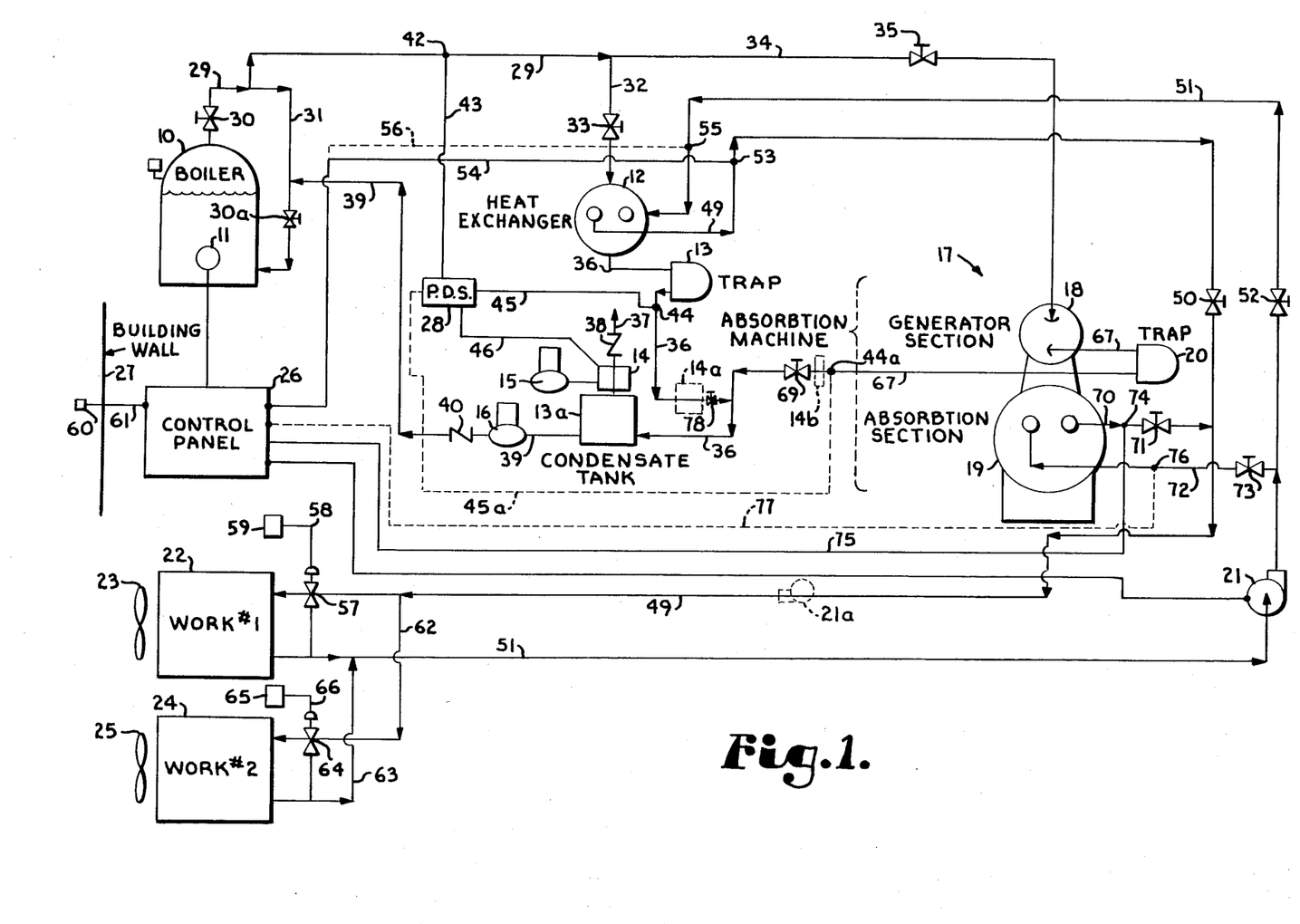
FIG. 1 is a schematic flow diagram of the subject improved steam powered heating/cooling system wherein steam is provided from a boiler alternatively to a heat exchanger and an absorption machine depending on the season of the year (winter/heating and summer/cooling).
Figure 2:
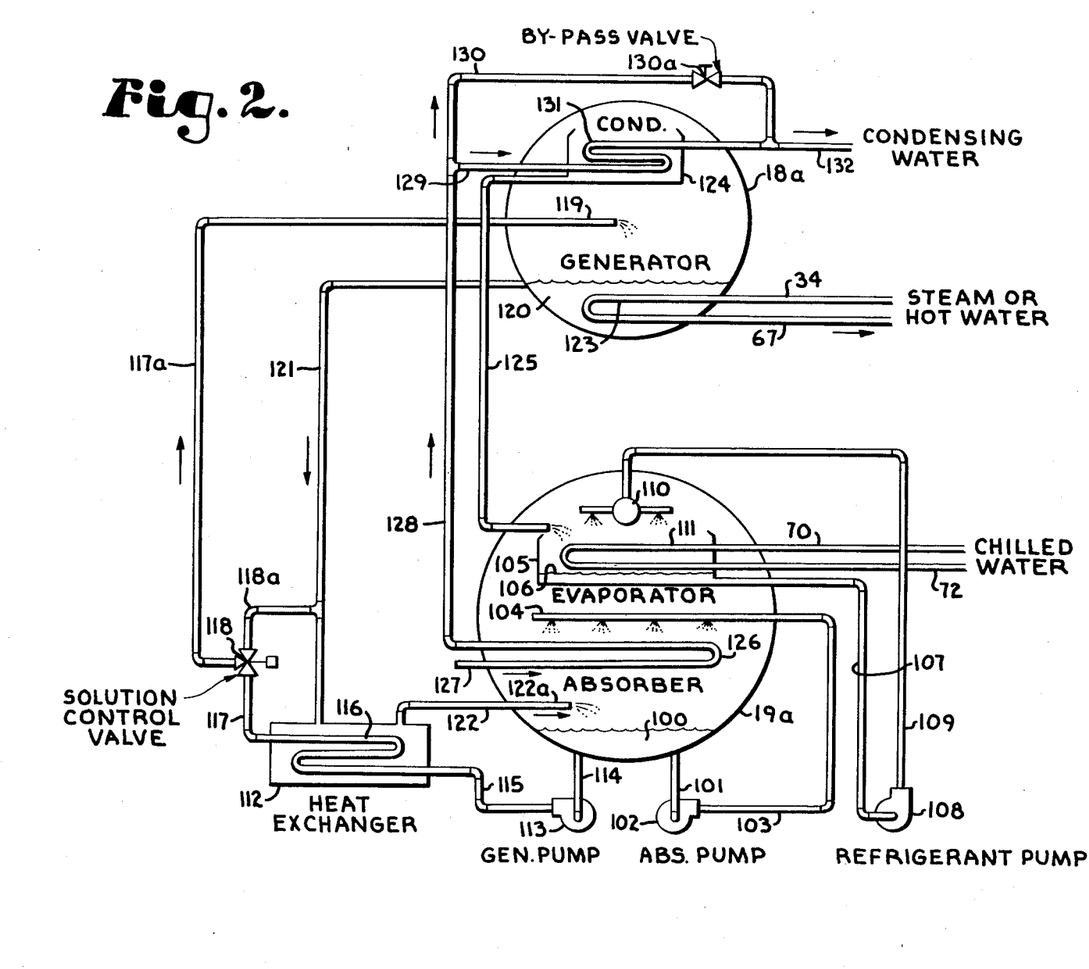
FIG. 2 is an enlarged schematic view of the internal structure of the absorption machine seen to the right center in FIG. 1.

With respect to the description of the "normal" or conventional heating/cooling system of the type described and improved herewithin, reference may be made to the drawings of this particular case. FIG. 1, for example, shows many of the elements of the "normal" or conventional steam powered heating cooling system with a heat exchanger for the former and an absorption machine for the latter. In FIG. 2, there is seen, schematically, the structure and function of a conventional absorption machine, such relevant to normal system operation.

A conventional heating system of the type with respect to which the subject improvements are made typically has:

(1) A boiler,
(2) A heat source for such boiler (a burner in said boiler);
(3) A steam-liquid heat exchanger;
(4) A steam trap following the heat exchanger,
(5) A condensate tank for the vent line to atmosphere; and
(6) Work to be heated.

There is also present, in said conventional heating system:

(7) A steam supply line from the boiler to the heat exchanger;
(8) A condensate return line from the heat exchanger to the trap to the condensate tank;
(9) A return line from the condensate tank to the boiler;
(10) An outlet supply line from the heat exchanger to the work;
(11) A return line from the work to the heat exchanger,
(12) A condensate return pump on the return line from the condensate tank to the boiler; and
(13) A system circulation pump positioned on one of (a) the return line from the work to the heat exchanger and (b) the said outlet supply line from the heat exchanger to the work.

A conventional or typical cooling system which is steam powered typically has:

(1) A boiler;
(2) A heat source for said boiler;
(3) An absorption machine having a generator section and an absorber section;
(4) A steam trap for this generator section of the absorption machine;
(5) A condensate tank with a vent line to atmosphere; and
(6) Work to be heated.

There is also, in said standard or conventional cooling system:

(7) A steam supply line from the boiler to the generator section of the absorption machine;
(8) A condensate return line from the generator section of the absorption machine through the steam trap to the condensate tank;
(9) A return line from the condensate tank to the boiler;
(10) An outlet supply line from the absorption section of the absorption machine to the work,
(11) A return line from the work to the absorption section of the absorption machine;
(12) A condensate return pump on the return line from the condensate tank to the boiler; and
(13) a system circulation pump positioned on one of (a) return line from the work to the absorption section of the absorption machine and (b) the said outlet supply line from the absorption section of the absorption machine to the work.

The described heating/cooling system is typically integrated into a single system as may be seen in FIG. 1 (and somewhat FIG. 2) when one abstracts from FIG. 1, particularly, but not exhaustively, the vacuum pump on the condensate tank overhead line, the pressure differential switch with its sensor and control connections, as well as the sensor connections for the boiler burner connecting to the indoor/outdoor reset control. It is important to realize that, in the above, the isolation valves for the heat exchanger and absorption machine are not listed. These, however, may be seen in FIG. 1 where they are later herein described and are essentially the same as in the standard system to shift from summer to winter operation and vice versa. Neither are shown all the valving of the lines of the "normal" or standard system.

In a "normal" or conventional steam powered heating/cooling system, the boiler burner is controlled by pressure controls on the boiler and a pressure (typically) of 12 psig is maintained continuously in the boiler. This, in turn, pressurizes the steam supply pipes to a control valve with respect to the heat exchanger or at the absorption machine. Such control valve, in winter operation, for the heat exchanger, throttles the volume of steam supplied to the heat exchanger to control the leaving water temperature therefrom to be pumped through the heat exchange coils of the work. Air blown through the latter heat the work space. In winter operation the isolation valves direct the water on the liquid side of the system through the heat exchanger, while isolating the absorption machine.

In summer operation, the isolation valves are changed to divert the normal system water supply to the work to and through the absorption machine. At this time, the steam control valve modulates the volume of steam employed to generate chilled water. The temperature of the leaving, chilled water from the absorption machine controls the steam valve.

Referring to both systems, the circulation pump on the water filled side of the system circulates the water through either the heat exchanger or absorption machine and the heating or cooling coils of the work. The steam traps keep the steam from passing into the condensate return system until the steam has given up its latent heat and is changed back to water (condensate).

Such condensate is transferred to the condensate return system by the pressure difference between the supply of 12 psig steam and the return system vented to atmosphere at 0 psig. The condensate tank accumulates the water and, because the boiler is at 12 psig, the condensate return pump is used to pump the water back into the boiler to be made into steam again. At 12 pounds of steam, the temperature of the steam is at about 244° F. and the condensate return will be at 200° F. or more.

THE PRIOR ART

The prior art of which applicant is aware is, fundamentally, the "normal" or conventional system referred to immediately above. In such, there is a heating system and a cooling system integrated with respect to a steam boiler with an absorption machine for cooling and a steam/liquid heat exchanger for heating.

The steam heating system utilizing the heat exchanger and the steam cooling system utilizing the absorption machine are run separately during the winter and summer seasons, respectively. They are not automatically switched on and off, but, rather, isolated from the selected operating system by valves on the system lines.

Such steam powered heating/cooling systems are restricted to large installation or, at least, relatively large installations.

The basic aspect of the normal system is that the boiler is maintained at 12 pounds pressure (psig) by means of a sensor which operates the burner of the boiler according to the pressure in the boiler. There are control valves on the heat exchanger and the absorption machine which sense (1) the temperature of the hot water leaving the exchanger in the heating system and (2) the chilled water leaving the absorption machine in the cooling system. In the first case, if the exchanger leaving water is too cold, then more steam is fed into the heat exchanger. In the absorption machine, in the cooling cycle, if the chilled leaving water is too hot, more steam is fed into the absorption machine.

In both cases of the heat exchanger and absorption machine, the steam is condensed therein, passed to a condensate tank which is vented to atmosphere and then the condensate pump back to the boiler.

OBJECTS OF THE INVENTION

A first object of the invention is to provide improvements in operation and efficiency with respect to combined heating/cooling systems which are steam powered by steam generated from a boiler.

Another object of the invention is to provide improvements in a steam powered heating system utilizing a steam/liquid heat exchanger to heat buildings or work spaces.

Yet another object of the invention is to provide improvements in a steam powered cooling system which incorporates an absorption machine with respect to cooling buildings or work spaces.

Another object of the invention is to provide methods of conserving energy, with respect to the systems described, by generating low temperature steam under a vacuum, while simultaneously modulating the burner as required by the actual load. In the summer time, the boiler burner is controlled from the chilled water temperature leaving the absorption chiller, as well as outside temperature. In the winter time, the boiler burner is controlled from the hot water temperature leaving the heat exchanger as well as outside temperature.

Another object of the invention is to provide such steam powered heating/cooling systems whereby, in order to conserve energy, low pressure steam is generated under a vacuum in the boiler therein, and, because the steam system operates under a vacuum, a higher vacuum is maintained in the condensate return system to the boiler to force the condensate through the steam traps.

A further object of the invention is to provide such boiler steam powered heating/cooling systems which optimally and most efficiently use the energy provided to power such systems, thus to markedly improve over the efficiency of the standard, normal or conventional type system.

Yet another object of the invention is to provide, in the system described, means and methods for controlling the heating of the boiler water (and the modulation of the boiler burner control), whereby to allow water to be heated in the boiler at as low a temperature steam as possible, while still handling the load requirements. Simultaneously, by maintaining a substantial pressure differential between the steam supply line and the condensate return line to the boiler, effective steam distribution is assured and, further, the necessary steam pressure, as well as its temperature, is held to the lowest and most optimum levels. In such manner, the input fuel requirements to the boiler burner are more directly and sensitively matched with the output heating/cooling requirement.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 1 STRUCTURE AND FLOW DIAGRAM

Referring to the drawings and particularly FIG. 1, FIG. 1 shows a schematic flow and control diagram for a combined heating and cooling system utilizing steam. The element, flow and control lines will be first described for the overll system, then the operation of the heating system for winter operation and, following that, the cooling system for summer operation.

The system has a boiler 10, with a heat source or burner 11 for the boiler. Heat exchanger 12 has steam trap 13 therefor. Condensate tank 13a has a vacuum pump 14 associated therewith. Tank 14 has hurling pump 15 connected thereto. There is a condensate return pump 16. An absorption machine 17 has generator section 18 thereof and absorption section 19 thereof. Steam trap 20 is associated with the generator section 18 of absorption machine 17. System circulation pump 21 may alternatively be supplied at 21a.

First work portion 22 is schematically designed and typically comprises liquid carrying heating/cooling coils through which air is driven by fan 23. Second work section 24, schematically designated, comprises a second set of heating/cooling coils through which air is driven by fan 25 for heat exchange. A control panel is schematically designated at 26, with the building wall indicated at 27. Pressure differential switch 28 (p.d.s.) is seen between boiler 10 and heat exchanger 12.

Starting from boiler 10, steam supply line 29 off the top of the boiler has manual shut off valve 30 thereon for boiler shut down. The conventional return loop line to the boiler from steam supply line 29 is seen at 31. Line 29 thereafter divides in, first, line 32 passing to the shell of heat exchanger 12. This line has manual shut off valve 33 thereon. The second line dividing from line 29 is line 34 which has manual shut off valve 35 thereon. Line 34 passes to the generator section 18 of absorption mchine 17.

Returning to heat exchanger 12, condensate return line 36 passes to steam trap 13 and thence to condensate tank 13a. Condensate tank 13a has overhead line 37 thereon, in which line are vacuum pump 14 and check valve 38. Condensate return line 39 has condensate return pump 16 and check valve 40 therein and joins line 31 with respect to return to boiler 10.

Pressure differential switch 28 is connected to sensor 42 by line 43 and, additionally, to sensor 44 by line 45. Control line 46 passes from pressure differential switch 28 to vacuum pump 14. Switch 28 is also attached to sensor 44 on line 67 by sensor line 45a as will be later described.

Returning again to heat exchanger 12, outlet supply line 49 from one side to the heat exchanger 12 tube bundle or coil (not seen) passes to the inlet to the heating/cooling coils (not seen) in first work section 22. Line 49 has manual shut off valve 50 thereon and may have optional (alternative) system circulation pump 21a also thereon. Return line 51 from work section 22 has system circulation pump 21 thereon, as well as manual shutoff valve 52. Return line 51 passes back to the other side of the heat exchanger tube bundle or coil in exchanger 12. This side of the system (lines 49, 51 and the coils in work sections 22 and 24, as well as the tube bundle in exchanger 12) is operated liquid full.

Sensor 53 on outlet supply line 49 is connected by sensor line 54 to control panel 26. Alternatively, sensor 55 may be provided on line 56 to control panel 26. Vacuum pump 14 on condensate tank overhead line 37 may, alternatively, be placed on the condensate return line 36 after trap 13 as seen at 14a. For the cooling season, a vacuum pump 14b may be placed on line 67 after trap 20 having control line 45a from switch 28. At work section 22, control valve 57 is connected by line 58 to, typically, a room thermostat 59. On the left hand side of control panel 26 is the view, composite sensor 60 is positioned outside the building wall and connected to control panel 26 by line 61.

Second work section 24 is connected to outlet supply line 49 by line 62 and to return line 51 by line 63. Control valve 64 on line 62 is connected to room thermostat 65 by line 66.

Now turning to the absorption machine generator section 18, as previously noted, line 34 runs from steam supply line 29 to generator section 18 of absorption machine 17. Condensate return line 67 passes through steam trap 20 and joins condensate return line 36 passing to condensate tank 13a. Manual shut off valve 60 is provided on line 67 after trap 20.

From the absorption section 19 of absorption machine 17, outlet supply line 70 with manual shut off valve 71 thereon passes to join line 49 to first work section 22. From return line 51, from the work, and after system circulation pump 21 thereon, return line 72, having manual shut off valve 73 thereon, passes back to absorption section 19.

The operation of the absorption machine will be described with respect to FIG. 2.

Sensor 74 is connected to control panel 26 by line 75. Alternatively, sensor 76 is connected to line 77 to control panel 26.

In order to operate the heating system, in winter operation, in shutting off and isolating the cooling system, manually operated valves 35 on line 34, 69 and line 67, 71 on line 70 and 73 on line 72 are all closed. On the other hand, manually operated valve 33 on line 32, manually operated valve 78 on line 36, manually operated valve 50 on line 49 and manually operated valve 52 on line 51 are all open. These arrangements serve to isolate the absorption machine section from the rest of the system so that winter heating operation may take place.

On the other hand, reversing the called out valve closings and openings isolates the heat exchanger from the circuit and enables the cooling functions be carried out in the system. The structure and function of the absorption machine, which is not a part of the invention, per se, will be described after the description of winter operation (heating system).

WINTER SYSTEM OPERATION

The heating system for winter operation will be first described. The valves noted above with respect to isolating and turning off the summer cooling system are turned off, thus isolating the absorption machine 17 from boiler 10 and work 22, 24. The valves for the heat exchanger are open. The description of the operation of the winter system will be described first with respect to a shut off state.

Referring to the left center of FIG. 1, at 60 is designated, schematically, two sensors which are employed to determine outside temperature and solar load. The outside temperature sensor, per se, is positioned in the shade. The solar load sensor is or comprises a solar sensor of standard type, specifically, just a small solar element. These sensors are correlated to give a composite, weighted value which hereinafter may be referred to as "outside temperature".

A set level in control panel 26 is provided for the system. Such set level depends upon the nature of the project but, for example, might be 65° F. This set level is governed by both outside temperature and solar load, as noted. If such outside temperature determination rises above the set level, the system is switched off. If it falls below such set level, the system is switched or turned on. Once the system is shut down, work load demands from the room thermostats 59 and 65, for example, will not turn the system on, only the sensed outside temperature falling below the set level.

As stated, if the outside temperature, sensed as noted, falls below the said set level, the system is turned off. This turn off means that: (1) burner 11 in boiler 10 is turned off; (2) vacuum pump 14 on the condensate tank overhead line 37 is turned off and (3) the system circulating pump 21 on line 51 from the work to heat exchanger 12 is turned off. If an alternative vacuum pump 14a were employed on condensate return line 36, such would be turned off. Yet further, if an alternative system circulation pump 21a on line 49 from the heat exchanger, were employed, such would be turned off.

Condensate return pump 16 after condensate tank 13a, however, operates off a float in the condensate tank, in returning condensate to the boiler. Pump 16 is not shut down because, as the system cools down, there will be further condensate which will go into tank 13a.

Thereafter, if the outside temperature falls below the said set level: (1) burner 11 in boiler 10 is started up, on low fire, (2) vacuum pump 14 on the condensate tank 13a overhead line 37 is started and (3) the system circulating pump 21 (21a) is started. The boiler is held on low fire (at burner 11) for, typically, one hour after start up in order to slow down heating in the boiler and permit the system to stabilize.

Vacuum pump 14 (14a) initially pulls a vacuum on the entire system. This is because, in steam trap 13, there is a temperature sensing bellows that remains open, venting air through the trap, until the initial steam hits such bellows, causing it to close off the air vent port. Thereafter, conventional steam trap 13 operates by a float action to release accumulated condensate into condensate return line 36, thereby to pass such to condensate tank 13a.

Thus, assuming the system is at (1) no pressurization and (2) no vacuum, the start up of vacuum pump 14 will pull down the pressure in the entire system, both before and after the heat exchanger. That is, from boiler 10 through condensate tank 13a. Specifically, this means the entire circuit including boiler 10, line 29 (valve 30 is open), line 29, line 32 (valve 33 is open), heat exchanger 12, condensate return line 36, trap 13, and condensate tank 13a. Check valves 38 and 40 block the condensate tank overhead line and that portion of line 39 after pump 16.

When the boiler pressure lowers to a point where steam is generated therein, initial steam moves into line 29 and 32 toward heat exchanger 12. In the initial start up, this condenses until sufficient steam has been generated to reach, through heat exchanger 12 and condensate return line 36, trap 13. As heretofore noted, such intitial steam hitting the temperature sensing bellows in the trap 13 closes off the venting air port therein and, therafter, trap 13 operates by float action, releasing accumulated condensate therein into condensate return line 36 after trap 13, such passing to condensate tank 13a.

Restating the above, the boiling point of the boiler water changes as the pressure drops in boiler 10. At some point, there arrives a balance between the burner 11 heat in the boiler and the vacuum being drawn on the system, whereby steam is generated from the boiler. Such steam passes into steam supply line 29 to heat exchanger 12. In the heat exchanger, some steam is condensed, but, shortly, steam reaches trap 13, closing the bellows therein and thereafter only condensate (not air) goes to the condensate tank.

Once the steam through lines 29, 32, heat exchanger 12 and condensate return line 36 after the heat exchanger has caused trap 13 to function in normal operation, a pressure differential between the steam supply line 29 and the condensate return line 36 (after trap 13) is created and then increases. As has been previously described, sensor 42 is on line 29, while sensors are connected to pressure differential switch 28 which, via line 46, operates vacuum pump 14 (14a). There is a set differential level between lines 29 and 36 (after the trap) around which the vacuum pump operation is cycled. Specifically governed by pressure differential switch 28, if the pressure difference goes below the set point or level, the vacuum pump is turned on, to again raise such pressure differential or difference. On the other hand, if the pressure difference rises past the set level or point, then vacuum pump 14 (14a) is turned off.

With respect to the subject system, for example, 65° F. outside temperature may only require 90° F. leaving water from exchanger 12 to the work. The initial action described above puts the system on line and stabilizes it. Vacuum pump 14 (14a) can pull 25 inches of mercury on the system. When the water temperature is in the range from 100° F. to 130° F., steam can typically be produced in 15 minutes from start up.

Vacuum pump 14 (14a) maintains the said pressure differential between steam supply line 29 and the condensate return line 36 between the trap 13 and tank 13a in a range of 2½ to 6 inches of mercury. This set pressure differential between (a) the steam pressure in the steam supply line 29 and boiler 10 and (b) the vapor pressure in condensate return line 36 after trap 13 (and condensate tank 13a itself) is maintained by sensing both pressures in pressure differential switch 28 by sensors 42 and 44 on the respective lines 43 and 45. Vacuum pump 14 (14a) is operated from a drop in said pressure differential below the set level thereof and turned off from a rise in said pressure differential above the set level thereof.

The operation of the boiler burner is controlled by sensing the leaving water temperature by sensor 53 on the outlet line 49 of heat exchanger 12. A drop in the leaving water temperature (with respect to a predetermined level thereof), due to work load increase, will operate (turn on or off, or modulate up or down) the burner. A rise in leaving water temperature in outlet line 49 sensed by sensor 53 connected to control panel 26 by sensor line 54 will modulate downwardly the burner 11 activity and vice versa. The critical leaving water temperature sensed in line 49 by sensor 53 (around which the burner will be operated) is also correlated with the outside temperature through sensor line 61 connecting to the described paired sensors schematically shown at 60. In this way, a drop in outside temperature will raise the set level or value of the critical leaving water temperature and vice versa.

Alternatively, the operation of boiler burner 11 may be controlled via sensor 55 in return line 51 from the work. In such case sensor line 56 is connected to control panel 26.

In standard operation of the heating system, once on and started up, vacuum pump 14 (14a) maintains the noted and selected pressure differential between the supply line 29 and condensate return line 36 after trap 13. This causes boiler 10 to be pulled into a relative vacuum condition so that the water in the boiler can be turned into steam in the boiler (and transported throughout the system) at a much lower temperature. Because, in this operation, the steam is generated at a much lower than normal temperature, the input fuel requirements to burner 11 may be closely matched with the output heated water temperature to or from the work via sensor 53 or 55.

This, in the winter heating season, with the previously delineated isolation valves circulating flow only through heat exchanger 12, either the leaving water temperature from heat exchanger 12 in line 49 or the return heater temperature to heat exchanger 12 in line 51 controls the burner operation directly as steam is generated in the boiler. By thus controlling the heating of the water and the modulation of the burner control, burner 11 directly allows water to be heated at as low a temperature steam possible while still handling the load requirements. Vacuum pump 14 (14a), in maintaining the noted pressure differential between the steam supply line 29 and condensate return line 36 after trap 13 assures effective steam distribution and, additionally, holds the steam pressure, as well as the temperature of the steam, to the lowest and most optimum levels. This thus more directly and sensitively matches the input fuel to the burner 11 with the output heating requirement. In the heating cycle, the leaving water temperature from heat exchanger 12, correlated with outside temperature, is typically reset in the range from 90° to 180° F.

There is, accordingly, provided, for the heating system, boiler 10, heat source or burner 11 for the boiler, steam/liquid heat exchanger 12, steam trap 13 for exchanger 12, condensate tank 13a with vent line 37 thereon to atmosphere and work 22, 24 to be heated. There is also provided, in said heating system, in combination:

(1) Steam supply line 29 from boiler 10 to heat exchanger 12;

(2) Condensate return line 36 from heat exchanger 12 through trap 13 to condensate rank 13a;

(3) Return line 39 from condensate tank 13a to boiler 10;

(4) Outlet supply line 49 from heat exchanger 12 to work 22, 24;

(5) Return line 51 from work 22, 24 to heat exchanger 12;

(6) A system circulation pump 21, 21a positioned on one of (a) the return line 51 from work 22, 24 to heat exchanger 12 and (b) outlet supply line 49 from exchanger 12;

(7) Vacuum pump 14, 14a on one of (a) tank vent line 37 and (b) condensate return line 36 after trap 13;

(8) Pressure differential switch 28 to which are connected sensor lines 43 and 45 from sensors 42 (on steam supply line 29) and 44 (on condensate return line 36 after trap 13);

(9) A sensor 53 on outlet supply line 49 from heat exchanger 12 to work 22, 24 or, alternatively, sensor 55 on return line 51 from said work;

(10) Sensors 60 located outside the building; and (11) The said sensors 53 (or 55) and 60 communicating with an indoor/outdoor reset control in control panel 26 operative to modulate or cycle on/off the burner.

ABSORPTION MACHINE STRUCTURE AND OPERATION

Turning to FIG. 2, therein is shown a schematic flow diagram of a standard Carrier Company absorption refrigeration machine which uses lithium bromide as the absorbent and water as the refrigerant. The following description of structure and function is based on the Carrier Company description of Operation And Maintenance of its absorption machine and particularly from the section of Chapter 3 thereof (Basic Cycle) entitled "Basic Absorption Refrigeration Cycle." This background material, in the Carrier Company literature, is dated February, 1966.

The reason for inclusion of schematic details of structure and function of this conventional absorption machine in this specification is for adequate and full disclosure purposes. Heat exchangers, basically involving an outer shell with a tube bundle therewithin, are simple and extraordinarily well known in structure and function to the refrigerating and heating system industries.

On the other hand, while many people in the said industries are perfectly familiar with the operation and structure of absorption refrigeration machines, and their employment for summer operation in a heating/cooling system utilizing steam from a boiler as the heating source, nevertheless, this device is much more complex and less well known generally than a heat exchanger.

The structure of the absorption machine will now be described, in conjunction with its system operation.

The subject absorption machine cycle is based on two principles:

(1) Lithium bromide solution has the ability to absorb water vapor; and (2) Water will boil, and absorb heat at low temperatures, when it is subjected to a high vacuum.

Basically, the above two principles are employed in the overall absorption machine to obtain refrigeration by spraying water (refrigerant) in a shell maintained at a high vacuum. A portion of the water (refrigerant) boils and absorbs heat from the remaining water (refrigerant). The water (refrigerant) vapor is then absorbed by the lithium bromide solution.

In FIG. 1, the absorption machine schematically illustrated therein shows only the inlet and outlet connections to and from the generator and absorption sections thereof which are required for the cooling system operation. None of the circuitry or internal structure of the absorption machine generator and absorption sections are shown in FIG. 1. To detail such somewhat and show the function of the device is the purpose of FIG. 2.

Referring first to the absorption section vessel shell 19a, there is first provided, in the lower portion of said shell, a body 100 of lithium bromide solution (absorbent). Take off line 101 from the bottom (or near bottom) of shell 19a passes to absorber pump 102 and thence into line 103. Line 103 passes back into shell 19a to spray header 104.

Inside shell 19a, in the upper portion thereof, there is provide a reservoir 105 which has a water body 106 received therewithin. Take off line 107 from reservoir 105 passes to refrigerant pump 108. Discharge line 109 from pump 108 leads to spray head manifold 110 above the said reservoir 105.

Referring back to the right hand side of FIG. 1, line 72 returns water or refrigerant medium from work 22, 24, return line 51 being connected to line 72. Line 72 leads to coil 111 in reservoir 105 with the off line from the coil being line 70 which connects to line 49 to the work.

Beginning an initial process discussion with respect to the absorber section in shell 19a, particularly with respect to the parts at this time identified, the following may be said. The reservoir 105 is partially filled with refrigerant (water), while the lower portion of the shell at 100 is partially filled at 100 with lithium bromide solution (absorbent). A vacuum is pulled on shell 19a. By removing substantially all of the air from shell 19a, the boiling point of the water (refrigerant) is reduced. At an absolute pressure of 0.25 inches of mercury, the boiling point of water is 40° F. Any heat above this point is utilized to vaporize or boil the water (refrigerant).

Since water vaporizes more readily if it flows from a spray, refrigerant pump 108 is used to circulate this water from reservoir 105 through lines 107 and 109 to spray head 110. The chilled water coil 111 located under spray 110, via lines 70 and 72, as described with respect to FIG. 1, receives return water from the work air conditioning coils (or other loads) and supplies the heat within reservoir 105 for the evaporation load with respect to same. The water in coil 111 is cooled by evaporation of the refrigerant (water) cycled from water refrigerant body 106 to spray head 110 by refrigerant pump 108.

The surface area of lithium bromide which is exposed determines its rate of absorption. therefore, absorber pump 102 is employed to cycle lithium bromide from body 100 thereof through lines 101 and 103 into spray header 104. The spray greatly increases the surface area of the lithium bromide in the shell. As before stated, the lithium bromide solution is pumped from the bottom of the absorber shell through sprays 104 intermediate the height of the absorber shell.

In the absorption section or absorber shell 19a, the zone under spray header 104, above the lithium bromide body 100, is referred to as the absorber section. The zone within vessel or reservoir 105 below spray header 110 is referred to as the evaporator section.

As the lithium bromide continues to absorb water (refrigerant) vapors, such lithium bromide solution becomes diluted and its ability to absorb water/refrigerant vapors decreases. This solution must be reconcentrated, which calls for the generator section 18 of absorption machine 17. The generator section vessel shell 18a is positioned above the absorption section 19 or absorber shell 19a.

In aid of the reconcentration required, heat exchanger 112 is provided. Generator pump 113 takes lithium bromide solution from body 100 thereof through line 114 and passes it thence through line 115 to coil 116 in heat exchanger 112. Off line 117, after passing through solution control valve 118 (to be described), passes overhead as line 117a which then passes into generator shell 18a intermediate the height thereof into discharge line 119. As a result of this flow, a body 120 of the absorbent/refrigerant liquid (water/lithium bromide) is accumulated in the lower portion of generator section shell 18a.

Return line 121, leaving shell 18a at the level it is desired to maintain body 120 therein, returns to heat exchanger shell 112. Line 122 from exchanger 112 passes into the lower portion of the absorption section shell 19a between spray head 104 and liquid body 100.

Referring again back to FIG. 1, steam supply line 34 from boiler 10 passes into the upper side of coil 123 in the lower portion of shell 18a in liquid body 120. The lower side of said coil discharges into line 67 which, see FIG. 1, passes to steam trap 20.

Now referring to additional process aspects of the apparatus array as described to this point, the reconcentration of the absorbent lithium bromide body 100 may be described. As previously noted, as the lithium bromide absorbent continued to absorb water refrigerant vapors in shell 19a, liquid body 100 becomes diluted and its ability to absorb further refrigerant vapors decreases. The newly described apparatus elements and generator section are added in order to enable reconcentration of said lithium bromide body 100 in shell 19a.

In aid of this, the weak lithium bromide/water solution is pumped by generator pump 113 through lines 114 and 115, coil 116 and lines 117 and 117a to input line 119 intermediate the height of generator shell 18a. The said solution body 120 is heated by a steam or hot water coil 123. In the specific system here discussed, this is a steam coil. From liquid body 120, the refrigerant (water) vapors which are picked up in the lithium bromide solution in the absorber shell are boiled out of the solution body 120. The strong or reconcentrated solution then returns to the absorption section shell 19a via lines 121, 122 and 122a. Since it is necessary to heat the weak solution in the generator portion of the absorption machine generator section, specifically liquid body 120, and cool the strong lithium bromide solution in body 100 in the absorber portion of the absorption section, heat exchanger 112 was added in the solution circuit between the absorber section of shell 19a and the generator section of shell 18a.

Returning to generator shell 18a, when the weak lithium bromide/water solution in body 120 is heated, the water/refrigerant is changed to a vapor. This vapor has to be changed back to a liquid state before it can be reused in reservoir 105 of the evaporator section of shell 19a. To accomplish this, a condenser is added in the upper portion of generator section shell 18a to condense the water/refrigerant vapors.

In order to accomplish this, reservoir 124 is provided in the upper portion of generator section shell 18a having a return line 125 from the bottom thereof. Line 125 passes into the top of shell 19a above reservoir 105 and discharges there into reservoir 105.

In shell 19a, between water/refrigerant spray header 104 and heat exchanger return line 122a, there is provided coil 126. Coil 126 receives, in intake line 127 thereof, water from the sump of a cooling tower (not shown). Output line 128 from coil 126 passes overhead to the generator section shell 18a where it divides into lines 129 and 130. Line 129 connects with coil 131 in reservoir 124. The outlet of coil 131 discharges the condensing water from the said cooling tower sump through line 132 which passes to the top sprays of the previously mentioned cooling tower (not shown). Bypass line 130, with bypass valve 130a therein, joins line 132.

In shell 18a of the generator section 18, the lower portion of shell 18a below input line 119 is referred to as a generator, while that upper zone of shell 18a in and above reservoir 124 is referred to as a condenser.

As previously noted, the condenser in shell 18a, utilizing reservoir 124 and coil 131, was added to condense the water/refrigerant vapors rising out of the heated liquid body 120 in the lower portion of shell 18a. These water/refrigerant vapors condense when they come into contact with the condenser water coil 131. The condensate water, received in reservoir 124, flows back to reservoir 105 in the upper portion of shell 19a via line 125.

In the apparatus and system so far described, the absorption machine would produce full capacity at all times. To modulate or control the capacity, three way solution control valve 118 is installed between the weak solution line (114, 115, coil 116, 117, 117a and 119) to the generator of the generator section 18 and the strong solution line 121, coil 116, 122, 122a to the absorber in shell 19a. For this control, line 118a comes off one side of three way solution control valve 118, connecting to line 121 before heat exchanger 112.

Solution control valve 118 is controlled by a controller which senses the temperature of the leaving chilled water through line 70 to the work. When the leaving chilled water temperature in line 70 is at or above the designated level or point, the absorption machine will be run at full load.

In the latter condition, the solution control valve will direct all of the solution from line 117 through line 117a and 119 to liquid body 120 in the generator portion of shell 18a. There such weak solution can be concentrated. On the other hand, as the chilled water temperature in line 70 drops below the designated level, a portion of the solution is directed back to the absorber through line 118a joining line 121, thus passing back to liquid body 100 in the bottom of the shell 19a. At no load conditions, all of the solution in line 117a passes through line 118a, line 121, heat exchanger 112, line 122 and line 122a directly back into the absorption section of shell 19a and into liquid body 100.

Referring to the condensing water bypass line 130 and valve 130a, it should be noted that the quantity of water required through the condenser in shell 18a (into reservoir 124) is approximately 75 percent of that flowing through the absorber in the lower portion of shell 19a. To maintain this flow, bypass line 130 with valve 130a, a restricting valve, is placed around the condenser in the upper portion of shell 18a. This valve is set, at initial start up, to provide the correct flow of water through the condensor and should not be readjusted.

The Carrier Company operation and maintenance literature, in Chapter 3 "Basic Cycle", in addition to the "Basic Absorption Refrigeration Cycle" section noted, hereinbefore paraphrased, additionally provides information with respect to (1) the equilibrium diagram, (2) the evaporator circuit, (3) the solution circuit and (4) the condenser circuit. Such further elaboration and detailing of the basic absorption refrigeration cycle in absorption machine will not be stated here.

SUMMER SYSTEM OPERATION (COOLING)

The cooling system for summer operation will now be described. The valves noted previously with respect to isolating and turning on or off the summer cooling winter heating systems are now turned off for the winter system (33, 50, 52, and 78) and on for cooling (summer) operation (35, 69, 71 and 73), thus isolating the heat exchanger 12 from boiler 10 and work 22, 24. Thus the valves for the absorption machine are open and those for exchanger 12 are closed. The description of operation of the summer system will be described first with respect to a shut off state.

Referring to the left center of FIG. 1, at 60 is schematically shown the two sensors previously described which are employed to determine outside temperature and solar load.

These sensors will not be again described.

A set level in control panel 26 is provided with respect to the cooling system. Such set level depends upon the nature of the project but, for example, might be 70° F. Such set level is governed by both outside temperature and solar load, as noted. If such outside temperature determination rises above the set level, the cooling system is switched on. If it falls below such set level, the system is switched or turned off. Once the system is shut down, work load demands from the room thermostats 59 and 65, for example, will not turn the cooling system on, only the sensed outside temperature rising above the said set level.

As stated, if the outside temperature, sensed as noted, falls below the said set level, the system is turned off. This turn off means that: (1) burner 11 in boiler 10 is turned off; (2) the vacuum pump 14 on the condensate tank overhead line 37 is turned off and (3) the system circulating pump on line 51 from the work to the absorption section 19 of the absorption machine 17 is turned off. If alternative vacuum pump 14b and/or circulation pump 21a were to be employed, such would be turned off. Also the absorption machine pumps 102, 108 and 113 and the cooling tower circulation pumps and fan (not seen) are shut off.

Condensate return pump 16 following condensate tank 13a, however, operates of the float in the condensate tank, in returning condensate to the boiler. Pump 16 is not shut down because, as the system settles, there will be further condensate which will go into tank 13a.

Thereafter, if the outside temperature rises above the said set level: (1) burner 11 in boiler 10 is started up, on low fire; (2) vacuum pump 14 on the condensate tank 13a overhead line 37 is started and (3) the system circulating pump 31 (21a) is started. Yet further the absorption machine and cooling tower pumps listed above are turned on. The boiler is held on low fire (at burner 11) for, typically, one hour after start up in order to slow down heating in the boiler and permit the system to stabilize.

Vacuum pump 14 (14a) initially pulls the vacuum on the entire steam system (line 36 after valve 78, line 67, trap 20, generator shell 18a, line 34 and line 29). The reason for this is previously described with respect to the heating system. Once initial steam hits the temperature sensing bellows (not seen) in trap 20, the bellows closes off the air vent port and, thereafter, steam trap 20 operates by float action. The latter releases accumulated condensate into condensate return line 67, thereby to pass condensate (also via line 36 after valve 78) to condensate tank 13a.

Assuming the system is at (1) no pressurization and (2) no vacuum, the start up of vacuum pump 14 will pull down the pressure in the entire steam system, both before and after absorption machine 17. That is, from boiler 10 to condensate tank 13a.

When the boiler pressure lowers to a point where steam is generated therein, initial steam moves into lines 29 and 34 toward generator section 18 of absorption machine 17. In initial start up, such intial steam condenses (in coil 123, for example) until sufficient steam is generated to reach, through coil 123 and the first length of condensate return line 67, trap 20.

Restating the above, the boiling point of the boiler water changes as the pressure drops in boiler 10. At some point, there is reached a balance between the burner 11 heat in the boiler and the vacuum being drawn on the system, whereby steam is generated from the boiler. Such steam passes into steam supply lines 29 and 34 to coil 123 of the generator section 18 of the absorption machine. In coil 123 some steam is condensed, but, shortly, steam reaches trap 20, closing the air port bellows therein and, thereafter, only condensate (not air) goes to condensate tank 13a via line 57 and 36.

Once the steam through lines 29, 34, coil 123 and condensate return lines 67 and 36 has caused trap 20 to function in normal operation, a pressure differential between steam supply lines 29, 34 and condensate return lines 67 (after trap 20) and 36 is created and then increases. As has been previously described, sensor 42 is on line 29, while sensor 44a is on condensate return line 67 after trap 20. These sensors are connected to pressure differential switch 28 which, via line 46, operates vacuum pump 14 (14a).

There is a set differential level between lines 29 and 67 (after trap 20) around which the vacuum pump 14 operation is cycled. Specifically, governed by pressure differential switch 28, if the pressure difference goes below the said set point or level, the vacuum pump is turned on to again raise such pressure differential or difference. On the other hand, if the pressure difference rises past the set level or point, then vacuum pump 14 (14a) is turned off.

With respect to the subject system, for example, 70° F. outside temperature may only require 50° F. water in boiler 10 to maintain. The initial action described above puts the cooling system on line and stabilizes it. The vacuum pump 14 (14a) can pull 25 inches of mercury on the system. When the water temperature in the boiler is in the range from 130° F. to 160° F., steam can typically be produced in 15 minutes from start up.

Vacuum pump 14 maintains the said pressure differential between steam supply lines 29, 34 and the condensate return lines 67 (after trap 20) and 36 (after valve 78) in a range of 2½ to 6 inches of mercury. This set pressure differential between (a) the steam pressure in the steam supply lines 29, 34 and boiler 10 and (b) the vapor pressure in condensate return lines 67 (after trap 20) and 36 (after valve 78) is maintained by sensing both pressures in pressure differential switch 28 by sensors 42 and 44a on the respective lines 29, 34 and 67, 36. Vacuum pump 14 (14a) is operated from the drop in pressure differential below the set level thereof and turned off from a rise in the pressure differential above the set level thereof.

The operation of the boiler burner is controlled by sensing the leaving water temperature from coil 111 in shell 19a by sensor 74 on line 70 leaving coil 111 from the evaporator of the absorption section 19. A rise in the leaving water temperature (with respect to a predetermined level thereof), due to work load increase, will operate or increase operation (turn on or modulate upwardly) of burner 11 and vice versa. A rise or a fall in leaving water temperature in outlet line 70 will be sensed by sensor 74 connected to control panel 26 by sensor line 75. Such sensed leaving water temperature rise or fall will modulate upwardly or downwardly the burner activity, respectively, or turn such on or off. The critical leaving water temperature sensed in line 70 by sensor 74 (around which the burner will be operated) is also correlated with the outside temperature/humidity through sensor line 61 connecting to outside sensors 60 which, in cooling operation, includes an enthalpy sensor/override. By the latter connection a rise in outside humidity will lower the set level or value of the critical leaving water temperature and vice versa.

Alternatively, the operation of boiler burner 11 may be controlled via sensor 76 in return line 72 from the work. In such case, sensor line 77 is connected to control panel 26 and sensors 60.

In standard operation of the cooling system, once such is on, started up and stabilized, vacuum pump 14 (14a) maintains the noted and selected pressure differential between the steam supply lines 29, 34 and the condensate return line 67 after trap 20 (also 36 after valve 78). This causes boiler 10 to be pulled into a relative vacuum condition so that water in the boiler can be turned into steam in the boiler (and transported throughout the system) at a much lower temperature. Because, in this operation, the steam is generated at a much lower than normal temperature, the input fuel requirements to burner 11 may be closely matched with the output cooled water temperature to or from the work by means of sensors 74 or 76.

Thus, in the summer cooling season, with the previously delineated isolation valves circulating steam flow only through coil 123 of the generator in generator section 18 of the absorption machine 17, either the leaving water temperature from coil 111 in the evaporator in absorption section 19 (shell 19a) in line 70 or the return water temperature of coil 111 coming in through line 72 controls the burner operation directly, as steam is generated in the boiler. By thus controlling the heating of the water and the modulation of the burner control, burner 11 directly allows the leaving water to be cooled at as low a temperature steam as possible, while still handling the load requirements.

Vacuum pump 14 (14a) in maintaining the noted pressure differential between the stem supply line 29, 34 and condensate return lines 67, 36 assures effective steam distribution and, additionally, holds the steam pressure, as well as the temperature of the steam, at the lowest and most optimum levels. This thus more directly and sensitively matches the input fuel to burner 11 with the output heating requirement. In the cooling cycle, the leaving water temperature from absorption section 19 (coil 110 in evaporator thereof in line 70) is typically reset in the range from 45° F. to 50° F.

There is, accordingly, provided, with respect to the cooling system: boiler 10, heat source or burner 11 for the boiler, absorption machine 17 having generator section 18 and absorption section 19, steam trap 20 for the generator in shell 18a of absorption machine 17, condensate tank 13a with vent line 37 thereon to atmosphere and work 22, 24 to be heated. There is also provided, in said cooling system:

(1) Steam supply line 29, 34 from boiler 10 to line 34 of the generator section 18 of absorption machine 17;

(2) Condensate return line 67 from generator section 18 through trap 20 to condensate tank 13a via lines 67 (after trap 20) and 36 (after valve 78);

(3) Outlet supply line 70 from coil 111 in absorption section 19 of absorption machine 17 to work 22, 24;

(4) Return line 72 from work 22, 24 to coil 111 in absorption section 19;

(5) A system circulation pump positioned on one of (a) the return line 51 from work 22 (before isolation valve 52) and (b) outlet supply lines 49 and 70 (after isolation valve 50);

(6) Vacuum pump 14, 14a, 14b on one of (a) tank vent line 37 and (b) condensate return line 67 after trap 20 (or return line 36 after valve 78);

(8) Pressure differential switch 28 to which are connected sensor lines 43 and 45a from sensors 42 (on steam supply line 29) and 44a (on condensate return line 67 after trap 20);

(9) A sensor 74 on outlet supply line 70 from generator absorption section 19 to work 22, 24 or, alternatively, sensor 76 to return line 52 (before valve 52 and 72);

(10) Sensor(s) 60 located outside the building; and (11) The said sensors 74 (or 76) and 60 communicating with an indoor/outdoor reset control in control panel 26 operative to modulate or cycle on/off the burner.

From the foregoing, it will be seen that this invention is one well adapted to attain all of the ends and objects hereinabove set forth together with other advantages which are obvious and which are inherent to the process.

It will be understood that certain process and apparatus features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A cooling system having a boiler, a heat source for the boiler including a burner, an absorption machine having a generator section and an absorber section, a steam trap for the generator section of the absorption machine, a condensate tank with a vent line to atmosphere and work to be heated, there also being, in said cooling system, in combination:
(1) a steam supply line from the boiler to the generator section of the absorption machine,
(2) a condensate return line from the generator section of the absorption machine through the steam trap to the condensate tank,
(3) a return line from the condensate tank to the boiler,
(4) an outlet supply line from the absorption section of the absorption machine to the work,
(5) a return line from the work to the absorption section of the absorption machine,
(6) a condensate return pump on the return line from the condensate tank to the boiler,
(7) a system circulation pump positioned on one of (a) the return line from the work to the absorption section of the absorption machine and (b) the outlet supply line from the absorption section of the absorption machine to the work,
(8) a vacuum pump on the condensate tank vent,
(9) a pressure differential switch in a sensor line connecting sensors on (a) the steam supply line from the boiler to the generator section of the absorption machine and (b) the condensate return line after the trap, said pressure differential switch operative to control operation of the said vacuum pump with respect to the pressure differential between said lines rising above and falling below a set level thereof,
(10) a sensor on the outlet supply line from the absorption section of the absorption machine to the work said sensor communicating with the burner to modulate or cycle on/off the burner,
whereby a pressure differential between (a) the steam pressure in the steam supply line and the boiler and (b) the vapor pressure in the condensate return line to the condensate tank after the steam trap and the condensate tank itself may be maintained by sensing both pressures in said pressure differential switch by the said sensor lines and operating the said vacuum pump from a drop in said pressure differential below the set level thereof, thus to maintain a pressure differential between the steam supply line and the condensate return line,
the operation of the boiler burner being controlled by sensing the leaving water temperature on the outlet line from the absorption section of the absorption machine to the work so that a drop in leaving water temperature, due to work load increase, operates the burner.

2. A cooling system as in claim 1 wherein the pressure differential between the steam supply line and the condensate return line is maintained in a range of 2½ to 6 inches of mercury.

3. A cooling system as in claim 1 wherein the vacuum pump is positioned, instead, on the condensate return line after the steam trap.

4. A cooling system as in claim 1 wherein the operation of the boiler burner is controlled, instead, from the return water temperature in the return line from the work to the absorption section of the absorption machine by means of a sensor on said return line.

5. In a cooling system having:
(1) a boiler,
(2) a heat source for said boiler,
(3) an absorption machine having a generator section and an absorber section,
(4) a steam trap for the generator section of the absorption machine,
(5) a condensate tank with a vent line to atmosphere, and
(6) work to be heated, there also being, in said cooling system:
(7) a steam supply line from the boiler to the generator section of the absorption machine,
(8) a condensate return line from the generator section of the absorption machine through the steam trap to the condensate tank,
(9) a return line from the condensate tank to the boiler,
(10) an outlet supply line from the absorption section of the absorption machine to the work,
(11) a return line from the work to the absorption section of the absorption machine,
(12) a condensate return pump on the return line to the condensate tank to the boiler and
(13) a system circulation pump positioned on one of (a) the return line from the work to the absorption section of the absorption machine and (b) the said outlet supply line from the absorption section of the absorption machine to the work,
the improvement which comprises:
(1) a vacuum pump positioned on the condensate tank vent line,
(2) a pressure differential switch connected by sensor lines to sensors on (a) the steam supply line from the boiler to the generator section of the absorption machine and (b) the condensate return line after the trap, said pressure differential switch operative to control operation of the said vacuum pump with respect to the pressure differential between said line rising above and falling below a set level thereof,
(3) sensors (a) on the outlet supply line from the absorption section of the absorption machine to the work and (b) to the outside, each said sensor communicating with an indoor/outdoor reset control to modulate or cycle on/off the burner,
(4) creating and maintaining a pressure differential between (a) the steam pressure in the said steam supply line and boiler and (b) the vapor pressure on the condensate return line after the trap to the condensate tank and in the condensate tank itself by means of sensing both said pressures (a) and (b) in said pressure differential switch by the said sensor lines and operating the said vacuum pump from a drop in said pressure differential below the set level thereof, thus to maintain the said pressure differential in the range of 2½ to 6 inches mercury,
(5) controlling the operation of the boiler burner by sensing the leaving water temperature on the outlet line from the absorption section of the absorption machine to the work so that a drop in leaving water temperature, due to work load increase, operates the burner, the critical leaving water temperature at which the burner is operated also being correlated with the outside temperature, so that a drop in outside temperature will raise the critical leaving water temperature level and vice versa.

6. An improvement as in claim 5 wherein the said vacuum pump is, instead, positioned on the condensate return line after the trap.

7. An improvement as in claim 5 wherein the operation of the boiler burner is controlled, instead, with respect to the return water temperature in the return line from the work by means of a sensor on said latter line.

* * * * *